United States Patent
Olejnik et al.

(10) Patent No.: US 12,521,782 B2
(45) Date of Patent: Jan. 13, 2026

(54) JOINING METHOD, AND DEVICE FOR SUCH

(71) Applicant: MAHLE International GmbH, Stuttgart (DE)

(72) Inventors: Franciszek Olejnik, Stuttgart (DE); Marcin Bruchwalski, Stuttgart (DE); Krzysztof Kurzawa, Stuttgart (DE); Dominik Pacyna, Stuttgart (DE); Pawel Magas, Stuttgart (DE); Bartosz Hybsz, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 19/015,947

(22) Filed: Jan. 10, 2025

(65) Prior Publication Data
US 2025/0229316 A1     Jul. 17, 2025

(30) Foreign Application Priority Data
Jan. 11, 2024   (DE) ................... 10 2024 100 718.4

(51) Int. Cl.
*B21D 39/04*     (2006.01)
*B21D 26/033*    (2011.01)
(Continued)

(52) U.S. Cl.
CPC ........... *B21D 39/04* (2013.01); *B21D 26/033* (2013.01); *B21D 26/049* (2013.01);
(Continued)

(58) Field of Classification Search
CPC .. B21D 26/033; B21D 26/047; B21D 26/049; B21D 26/051; B21D 39/04; B21D 39/06;
(Continued)

(56) References Cited

U.S. PATENT DOCUMENTS 4,220,034 A * 9/1980 Pogonowski ......... E21B 43/106
                                                      29/523
4,513,598 A * 4/1985 Costabile ............. B21D 26/045
                                                      72/58
(Continued)

FOREIGN PATENT DOCUMENTS

DE       19533827       1/1997
DE       19929375       12/2000
(Continued)

OTHER PUBLICATIONS

German Examination Report issued in Patent Application No. 10 2024 100 718.4, dated Nov. 1, 2024. For informational purposes only.

*Primary Examiner* — Jermie E Cozart
(74) *Attorney, Agent, or Firm* — Barnes & Thornburg LLP

(57) ABSTRACT

A method and a device for obtaining a joint between two surfaces of two parts that have a simple curvature are proposed in which a mandrel is placed below the first surface, which contains a moving stamp in its interior. A template is placed above the second surface, which has a deep drawing opening. The stamp is moved along the surface normals of the two surfaces, such that material forming the two surfaces is forced into the deep drawing opening, wherein the deep drawn and compressed portion of the first surface engages behind the remaining part of the second surface to obtain a form-fit connection between the two surfaces. The stamp blocks a channel inside the mandrel until pressure from a medium therein causes the stamp to move.

8 Claims, 2 Drawing Sheets

Figure 1:
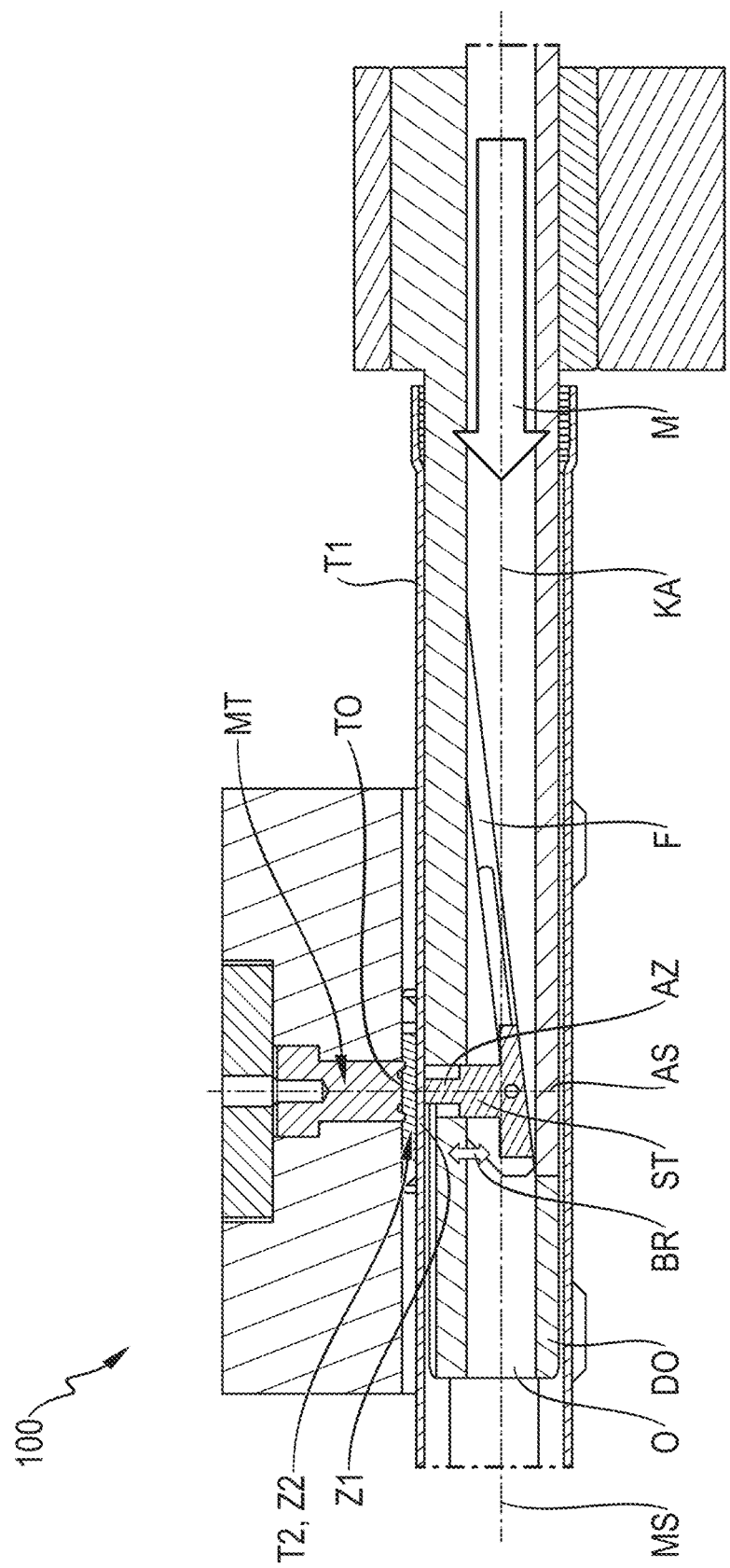

(51) Int. Cl.
*B21D 26/049* (2011.01)
*B21D 39/20* (2006.01)
B21D 26/051 (2011.01)
B21D 26/057 (2011.01)
B21D 39/06 (2006.01)
B21D 53/06 (2006.01)

(52) U.S. Cl.
CPC .......... *B21D 39/203* (2013.01); *B21D 26/051* (2013.01); *B21D 26/057* (2013.01); *B21D 39/06* (2013.01); *B21D 53/06* (2013.01)

(58) Field of Classification Search
CPC .. B21D 39/203; B21D 22/205; B21D 26/057; Y10T 29/49805
See application file for complete search history.

(56) References Cited

U.S. PATENT DOCUMENTS

| 4,640,192 | A | * | 2/1987 | Nash | B21D 39/10 |
| | | | | | 228/2.5 |
| 4,840,053 | A | * | 6/1989 | Nakamura | B21D 26/037 |
| | | | | | 72/58 |
| 5,293,679 | A | * | 3/1994 | Hsu | B21D 39/04 |
| | | | | | 29/523 |
| 2020/0262465 | A1 | * | 8/2020 | Hiramatsu | B62D 1/16 |

FOREIGN PATENT DOCUMENTS

| DE | 102020104529 | 8/2021 | |
| EP | 1321203 A2 * | 6/2003 | ........... B21C 37/294 |

* cited by examiner

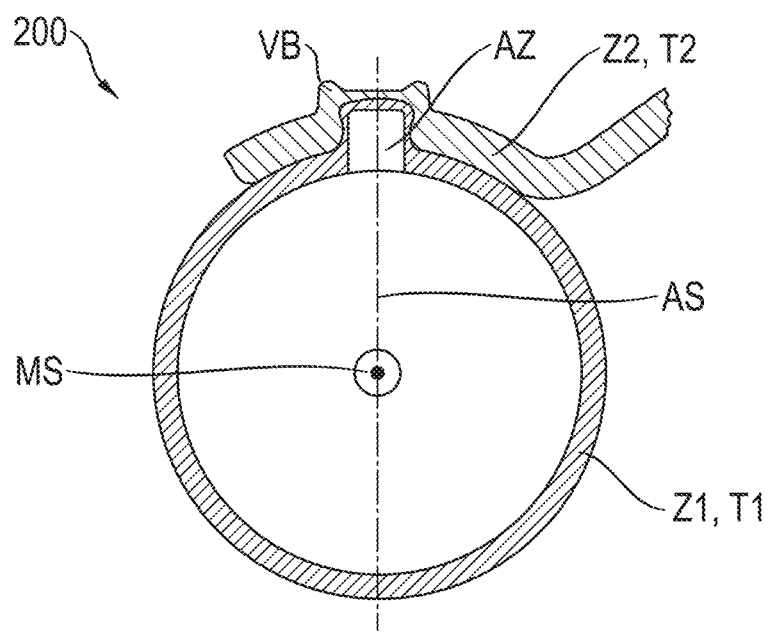
Fig. 2
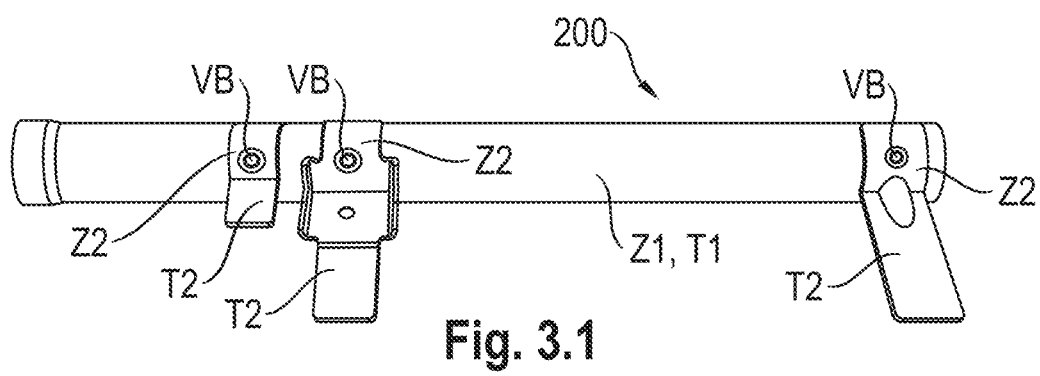
Fig. 3.1
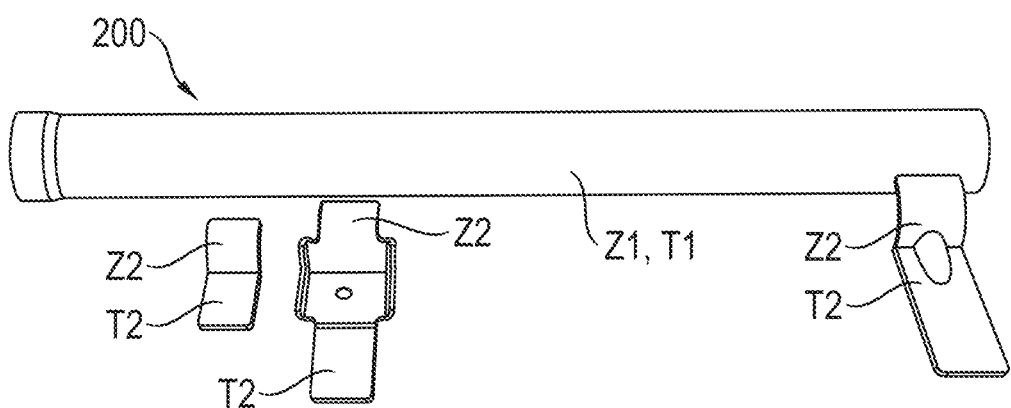
Fig. 3.2

JOINING METHOD, AND DEVICE FOR SUCH

CROSS-REFERENCE TO RELATED APPLICATIONS

This application claims priority from German Patent Application No. DE 10 2024 100 718.4, filed on Jan. 11, 2024, the entirety of which is hereby incorporated by reference herein.

The invention relates to a method and a device for joining surfaces of two parts that have a simple curvature, and a heat exchanger that contains the two parts.

Surfaces of two parts that have a simple curvature can be brazed or welded together. The first part can be a tube or a reservoir for a heat exchanger, and the second part can be a bracket. The heat exchanger can be attached to the body of a motor vehicle with the bracket. The second part can have a curved surface that is permanently attached to the first part. If they are welded together, the first and second part are heated. These parts are frequently made of an aluminum alloy. The thermal conductivity of the aluminum alloy can result in the formation of a large area affected by heat. The properties of the material are generally diminished in this area. Typical problems that arise in this area include increased brittleness, welding cracks, internal tensions, reduced strength, and reduced corrosion resistance. This can result in the parts failing during assembly or when in use, leading to high discard rates. When joining these parts in a brazing process, the parts are heated in a furnace. When connecting the two parts in a brazing furnace. The strength of the materials from which the two parts are made may be reduced due to this heating. If the first part is produced in an extrusion process, for example, the finished tube is stronger than the material prior to assembly. This increase in the strength of the material used for the first part is then lost during the brazing process. Furthermore, a method and device are disclosed in DE 199 29 375 A1 with which two flat plates or sections of flat plates are joined to one another from above. Unfortunately, it is not possible to join two surfaces of two parts with simple curvatures using the method and device disclosed therein.

The method obtained with the invention with the device obtained with the invention that have the features of the independent claims, have the advantage that two surfaces of two parts with simple curvatures can be joined to one another without having to heat the two parts.

The basis for the invention is a method for joining two parts. This joining method is used to connect at least two parts. These parts can be sheet metal, tubes, and/or structured parts. The parts are much longer and wider than their thicknesses. A tube is an elongated hollow body. It is much longer than its diameter and the thickness of its walls. This type of joining belongs to a group of methods for joining through material deformation. A joining device used for this type of joining contains a stamp and a template. The parts that are to be joined can contain a first metallic material that can be shaped. The template is rigid and has a deep drawing opening, resulting in an overlapping of the two parts in which a snap-like form is obtained resulting in a form-fit and force-fit connection. Deformation is understood to mean a behavior of the material in which an irreversible shaping is obtained with a force that exceeds the elasticity limits of the material. Below the elasticity limit of a material, the part returns to its original shape after the force is no longer applied. The joining method obtained with the invention contains the following steps: positioning surfaces of two parts with a simple curvature on top of one another. A surface with a simple curvature can be rolled over a flat surface without buckling or jumping. This curved surface can be the outer surface of a hollow cylinder. The first part can be a tube or half-pipe. The second surface can have a curvature that fits that of the first surface, such that the two parts fit together. A simple curved surface is a flat surface that can be unwound to a flat plane without any compression or tugging. Here, a simple curved surface can be the outer surface of a hollow cylinder. The first part can be, for example, a pipe or a half-pipe. The second surface can be a simple curved to match the first surface, so that a fit between the two surfaces of the two parts is created. Both parts can contain an aluminum alloy. The first part can be a seamless tube, or a brazed tube made of aluminum. The second part can be a bracket made of aluminum. The second part is then placed on top of the first. The two surfaces are curved such that they can be placed together without forming any gaps between them. This is the case when the outer diameter of the tube corresponds to the inner diameter of the second surface on the bracket. A mandrel with a moving internal stamp is then placed below the first surface. The mandrel can form an elongated hollow cylinder. The central axes of first part and the mandrel can coincide. This defines a radial direction and a longitudinal direction. Below the first surface can be defined as being radially further inward. If the first part is a tube, the mandrel can be inserted therein. The stamp needed for the joining process is thus inside the mandrel, such that it does not come in contact with the first surface when the mandrel is placed below the first surface. A template that contains a deep drawing opening is then placed above the second surface. The deep drawing opening can be circular with an undercut, or it can be rectangular with an undercut. The stamp is then moved toward the two curved surfaces from a starting point, forcing the material forming the two surfaces into this deep drawing opening. This step can be subdivided into other subsidiary steps. The material of the two parts is at least partially deformed by this. The deep drawing opening can have an upper shape and an annular channel at the stamp end. The material from the two surfaces can be pushed and forced into the deep drawing opening in a first subsidiary step. This material can then be swaged and flattened. The upper contour above the deep drawing opening can then be filled in, after which the annular channel can be filled in, forming lateral fins. This hooks the two surfaces together in a form-fit connection. The deep drawn and crimped surface parts of the first surface engage behind the part of the second surface that has remained intact. The stamp is then returned to its starting position. The template and mandrel are subsequently removed. A snap-like joint is thus obtained with this method. The two parts can contain a first metallic material, and they can exhibit a constant strength that is greater than, or at least equal to, the strength of the two parts prior to executing the method obtained with the invention. The first material can be an aluminum alloy. Strength is understood to mean the mechanical load-bearing capacity of a part before it fails. A fracturing or excessive deformation of the part can result in this failure, for example. Material bonding methods such as welding or brazing affect the strength of the part, at least in sections thereof. When two parts are welded together, an area is formed that is affected by the heat in which the strength may be significantly reduced. If two parts are brazed together, the heat in the brazing furnace can reduce the strength of the two parts. This reduction in the strength of the two parts must then be compensated for, e.g. by subsequently increasing the thickness of the walls of the parts.

Because the two parts are not heated with the method used in the invention, there are no areas affected by heat, and the strength of the parts is not reduced. Notches, like those formed with cutting methods, are also eliminated with this joining method. Consequently, a statically and dynamically strong joint can be obtained. By placing the stamp inside the mandrel, which is placed below the first surface, and placing the template above the second surface, access necessary for executing the joining method can be obtained from both sides. The joint can be particularly strong if the first part is thinner or weaker than the second, such that it is easier to shape than the second part.

A preferred exemplary embodiment of the method obtained with the invention is characterized in that the stamp blocks a channel in the mandrel until the pressure exerted by a medium in the channel causes it to move. This medium can be pressurized air. The medium can also be hydraulic fluid. The channel can be connected to a compressor. The stamp can be supported in the channel such that movement of the support along the length of the mandrel can be converted to a perpendicular movement of the stamp. The mandrel can contain guides or channels that conduct the medium to the stamp. The medium exerts pressure against a surface of the stamp, causing it to move in the desired manner. When the medium is no longer pressing against the surface on the stamp, gravity returns it to its starting position. The channel in the mandrel can contain a guide for the medium that conducts it to where it can exert pressure on the surface of the stamp. Placing the stamp inside the mandrel results in the stamp being placed inside a closed element. The stamp moves from inside toward the exterior, such that the joint is formed from the inside. If the first part is a closed tube, the mandrel is inserted in the tube, and the stamp is then moved by the pressure exerted thereon.

Another preferred exemplary embodiment of the method obtained with the invention is characterized in that a joint is obtained by at least partial deformation of the material forming the two surfaces, at least part of which ends up above and/or outside the two surfaces. As explained above, the formation of the joint created by the method obtained with the invention is directed outward from the interior. By forming the joint at least partially above and/or outside the two surfaces, the two parts do not become damaged when removing the mandrel. Moreover, the two parts will not catch on the mandrel. The mandrel can be placed next to or along an axis parallel to the two parts. This also increases the reliability of the method obtained with the invention.

Another preferred exemplary embodiment of the method obtained with the invention is characterized in that the movement of the stamp can follow the surface normal of at least one of the two surfaces. A surface with a simple curvature can have a surface normal. This direction can be at a right angle to the surface. If the surface normal of the two surfaces and the movement of the stamp are substantially aligned, the positioning of the stamp and the template can be simplified, further increasing the reliability of the method obtained with the invention. The term, "substantially" is understood to mean within a longitudinal deviation of ±2 and/or angular deviation of ±10°. These deviations can be attributed to longitudinal displacement or rotation.

Another preferred exemplary embodiment of the method obtained with the invention is characterized in that the first part can be a closed tube, and at least part of the wall of the tube forms the first surface, wherein the tube and mandrel are then positioned such that their central axes are substantially identical. Because the central axes of the tube and the mandrel coincide, the mandrel will not get stuck when it is inserted or removed from the tube. Because the stamp needed for the method obtained with the invention is placed inside the mandrel, and the template is placed above the second part and therefore outside the tube, this method can be used with closed tubes. Because the resulting joint is formed at least partially outside and/or above the two surfaces, the tube does not become damaged when removing the mandrel. It is particularly preferred when the joint is formed outside the inner diameter of the tube. The tube can have a circular cross section. The tube can also be a flat tube with an oval cross section.

Another preferred exemplary embodiment of the method obtained with the invention is characterized in that the template can be basically stationary, and the size of the deep drawing opening can be constant. The term, "basically stationary" is understood to mean that the template basically does not move in relation to the stamp. Consequently, the stamp and deep drawing opening can have simple shapes. The template can be placed above the two parts to clamp the parts together. Because the size of the deep drawing opening is constant, it is ensured that the material of the two surfaces is nearly entirely pressed into this opening.

In a first embodiment of the device for executing the method obtained with the invention, the channel has a hole through which the medium can be removed, and is connected to a pressure generator. The stamp can be moved by the pressure applied thereto. The medium can be air compressed by the pressure generator. The pressure generator can be a compressor. When the stamp has moved in the direction of the pressure, the medium can flow under the stamp and out of the mandrel. The medium holds the stamp in this position. After the compressor is shut off, the pressure is no longer exerted on the stamp and it returns to the starting position due to gravity. The device obtained with the invention can have a stand. The template can be connected mechanically to the stand such that it can be lowered onto the two parts and subsequently removed. The mandrel can be mechanically connected to the stand such that it can be placed below the two surfaces. This mandrel can have a central axis. The first part can also have a central axis. The first part can be clamped in the device and the mandrel can be placed below it such that the central axis of the mandrel is substantially identical to that of the first part. The stamp can have at least one movement axis. The stamp can move along this axis. The movement axis of the stamp can be perpendicular to the central axis of the mandrel. Consequently, the surface normal of the first surface of the first part is aligned with the movement axis of the stamp. The second part can be placed above the first part such that the surface normal of the second surface is aligned with the movement axis. The template can be placed above the two surfaces, thus clamping them in place.

In a second embodiment of the device obtained with the invention, the stamp can rotate in the channel. Consequently, the pressure acting along the central axis can move the stamp outward from the middle axis. This results in the parts of the two surfaces being pushed into the deep drawing opening by the stamp to obtain the joint. The stamp moves outward from the inside.

In another embodiment of the device obtained with the invention, the mandrel can have a lateral opening through which the stamp can pass. This lateral opening can have an axis that is aligned with the movement axis of the stamp. The lateral opening can be circular. The diameter of the opening can be large enough for at least part of the stamp to pass through it.

Another preferred exemplary embodiment of the device obtained with the invention is characterized in that the lateral opening in the mandrel can be sealed off from the environment by the first surface in a fluid-tight manner. A connection can be formed between the template and the first surface when the template is placed above the second surface. A force can then be obtained that is counter to the direction of the formation of the joint (toward the central axis of the mandrel). As a result of the pressure exerted by the template on the first surface, the lateral opening can be sealed off from the environment in a fluid-tight manner. This seal can be further improved by a rubber gasket, for example. "Fluid-tight" means that at most a negligible amount of the medium can pass through the connection.

In another embodiment of the device obtained with the invention, the deep drawing opening in the template can form a blind hole, both radially and axially. This deep drawing opening can thus be formed such that it does not pass entirely through the template. The cross section of the opening can be circular, thus resulting in a circular, punctiform joint. The base of the opening can be contoured, further improving the strength of the joint. This circular, punctiform joint can have the same strength in all planes, and be gas-tight.

In another embodiment of the device obtained with the invention, the stamp can have a round working pin that at least partially enters the deep drawing opening. This pin can be cylindrical or conical. Because the deep drawing opening can be circular, and the pin can also be round, a circular, punctiform joint can be obtained. The strength of the joint can be further increased by such a circular, punctiform joint, and the sealing effect in the joint can be further improved at the level of the stamp and the template.

In a first embodiment, the heat exchanger obtained with the invention can contain at least two parts that are joined using the method obtained with the invention. The first part can be a half-pipe, and the second can be a bracket. The heat exchanger can be attached to another component or the body of a motor vehicle with the bracket for example. The outer surface of the half-pipe can form the first surface, and the second surface can be part of the bracket. This second surface on the bracket can be curved to fit the first surface. The half-pipe and the bracket can then be permanently joined together using the method obtained with the invention. A half-pipe can be obtained by splitting a tube.

In a second embodiment of the heat exchanger obtained with the invention, the first part can be a tube, and the second can be a bracket. The heat exchanger can be attached to another component or the body of a motor vehicle with the bracket, for example. The diameter of the tube can be greater than 20 mm. This can be a closed tube, the material of which contains an aluminum alloy and is seamless. The heat exchanger obtained with the invention can contain other tubes through which a second medium can flow, and which are exposed to a third medium, such that heat is exchanged between the second and third media. The other tubes can be flat tubes, and there can be corrugated fins between them to increase the surface area for heat exchange. The tube forming the first part can be a tube from which the second medium is distributed to the other tubes and subsequently returned to. The heat exchanger could also be connected to a refrigerant circuit by the tube. The outer surface of the tube can be the first surface, and the second surface can be part of the bracket. The second surface can be curved to fit the first surface. The tube and the bracket can be joined to one another with the method obtained with the invention, and the heat exchanger obtained with the invention can thus contain at least one such joint. More than two brackets can be joined to the tube with the method obtained with the invention, such that the heat exchanger contains more than two such joints. A statically and dynamically strong joint can advantageously be obtained with this method. Areas affected by heat on the two parts, or a reduction in the strength of two parts, are eliminated, because practically no heat is generated by the method.

The refrigerant circuit obtained with the invention for a motor vehicle can contain at least one heat exchanger obtained with the invention. This heat exchanger can contain tubes through which a refrigerant flows, and which are exposed to another medium (e.g. air), such that a thermal exchange occurs between the refrigerant and the other medium. The tubes can be connected to two reservoirs in a fluid-tight manner, to distribute the refrigerant to the tubes and subsequently collect it. One of the two reservoirs forms the first part. Two brackets forming the second parts are connected to the reservoir using the method obtained with the invention. The heat exchanger can be connected to the body of the motor vehicle with the brackets. The refrigerant circuit obtained with the invention can contain the following: a heat exchanger obtained with the invention forming a condenser for a refrigerant, a reservoir for accumulating and storing the refrigerant, an expansion valve for the refrigerant, a vaporizer for the refrigerant, a compressor for the refrigerant, and connecting lines. A refrigerant flows through this circuit. Conceivably, R1234yf could flow through the refrigerant circuit. Alternatively, carbon dioxide (R744), propane (R290) or R134a could flow through the refrigerant circuit. Heat could be removed form the interior of a motor vehicle by the vaporizer, and this heat can then be discharged into the environment by the condenser.

FIG. 1: shows a sectional view of a first embodiment of the device for executing the method obtained with the invention;

FIG. 2: shows a sectional view of two parts that are joined together after executing the method obtained with the invention;

FIG. 3.1: shows a first part and three parts permanently connected thereto from above in a first embodiment obtained with the invention, after executing the method obtained with the invention; and FIG. 3.2: shows a first part and three parts permanently connected thereto from above prior to executing the method obtained with the invention.

A first embodiment of the device 100 for executing the method obtained with the invention is shown in a sectional view in FIG. 1. This device 100 contains a mandrel DO. This mandrel DO is formed by a hollow cylinder with an internal channel KA and a central axis MS. The stamp ST needed for the method is inside the channel KA and seals it in its starting position in a fluid-tight manner. The first part T1 is a closed tube forming a hollow cylinder. The mandrel DO is placed inside the first part T1. The tube can be slid over the mandrel DO. The material of the first part T1 can contain an aluminum alloy and form a seamless tube. The central axis MS is aligned with the central axis of the first part T1. The first part T1 is held in place in a clamp, not shown. The material of the second part T2 can contain an aluminum alloy. The mandrel DO has a lateral opening through which the stamp ST can be moved along the movement axis AS. The movement axis AS is thus perpendicular to the central axis MS. The second part T2 is placed above the first part T1 such that the surface normal of the second surface Z2 is aligned with the movement axis AS. The first part T1 is formed by a tube, and the first surface Z1 is the outer surface of the tube. The first surface Z1 formed by the outer surface of the tube (first part T1) has a simple curvature, and the surface normal of this outer surface substantially coincides with the movement axis AS. The second surface Z2 has a simple curvature. The second surface Z2 on the second part T2 is placed above the first surface Z1 of the first part T1 (seen from the central axis MA). The template MT is placed above the two surfaces Z1, Z2. The template MT is pressed against the two parts T1, T2 during the method obtained with the invention. The template MT contains the deep drawing opening TO. The deep drawing opening TO is formed by a circular blind hole. The medium M flows through the channel KA. The medium M is pressurized air. This can be generated by a compressor, not shown, connected to the channel KA. The stamp ST blocks the channel KA inside the mandrel DO such that the medium M cannot escape, until the pressure from the medium M acting on the stamp ST is strong enough to move the stamp ST along the movement axis AS. Consequently, a force acting along the central axis MS is converted into movement along the movement axis AS, which is substantially perpendicular to the central axis MS, and directed outward. The stamp ST is moved outward through a lateral opening in the mandrel along the movement axis AS. The round, conical working pin AZ on the stamp ST shapes the parts of the respective surfaces Z1, Z2 in the deep drawing opening TO in the template MT. The resulting joint, not shown, is formed starting from the interior and extending outward. The stamp ST is supported by a swivel joint in the mandrel DO. After the pressure of the medium M diminishes, the stamp is returned to its starting position by gravity. The medium M flows out of the channel KA through the opening O when the stamp ST has moved outward along the movement axis AS, because the lateral opening is sealed against the environment by at least the first surface Z1. The channel KA in the mandrel DO is narrowed by the guide F, and a surface on the stamp ST is exposed in a targeted manner to the medium M. "Substantially" means within a longitudinal deviation of ±2 mm and/or angular deviation of ±10°. These deviations can be attributed to longitudinal displacement or rotation.

Two parts T1, T2 connected by the joint VB obtained with the invention are shown in a sectional view in FIG. 2. The first part Z1 is a closed tube, and can be part of a supply line or drain line for a heat exchanger 200 obtained with the invention. Because the first part Z1 is a tube, the first surface Z1, forming the outer surface of the tube, has a simple curvature. The second part Z1 has the surface Z2 with a simple curvature, and can form a bracket. The second surface Z2 is curved to fit the first surface Z1, such that the first and second parts T1, T2 fit together. This is obtained in that the outer diameter of the tube (first part) and the inner diameter of the second surface Z2 on the second part T2 are substantially the same. The surface normals of the two surfaces Z1, Z2 are substantially aligned with the movement axis AS of the stamp, not shown. The central axis MS is that of the first part T1. The movement axis AS is substantially perpendicular thereto. The joint VB is a circular punctiform joint. The joint VB is advantageously outside the first part T1 and is directed outward. It thus extends outward, away from the central axis MS. The diameter of the tube forming the first part T1 can be greater than 25 mm. The mandrel, not shown, can advantageously be removed without damaging the first part T1, because the joint VB is directed outward, and the mandrel will not catch on it.

A first part T1 and three second parts T2 are shown from above in FIG. 3 prior to and after executing the method obtained with the invention. The first part T1 is a closed tube. The first surface Z1 is the outer surface of the tube, which has a simple curvature. The three second parts Z1 each have the second surface Z2. The second parts T2 are of different sizes. The curvature of the second surfaces Z2 first the simple curvature of the first surface Z1, such that the first part T1 and second part T2 fit together. This is obtained in that the outer diameter of the tube (first part T1) and the inner diameter of the second surface Z2 on the second part T2 are substantially the same. The heat exchanger 200 obtained with the invention contains the first part T1 and second part T2.

A first part T1 and three second parts T2 are shown after executing the method obtained with the invention in FIG. 3.1. The three joints VB are formed from the inside, and the three joints VB are each circular, punctiform joints. A first part T1 and three second parts T2 are shown from above prior to executing the method obtained with the invention in FIG. 3.2.

The specification can be readily understood with reference to the following Numbered Paragraphs:

Numbered Paragraph 1. A joining method comprising the following steps:
  positioning two surfaces (Z1, Z2) with simple curvatures on two parts (T1, T2) above one another,
  positioning a mandrel (DO) below the first surface (Z1), which contains a moving stamp (ST) in its interior,
  positioning a template (MT) above the second surface (Z2), which has a deep drawing opening (TÖ),
  moving the stamp (ST) along the surface normal of at least one of the two curved surfaces (Z1, Z2), such that material of the respective surfaces (Z1, Z2) is forced into the deep drawing opening (TÖ),
  wherein,
  in order to obtain a form-fit connection between the two surfaces (Z1, Z2), the deep drawn and compressed portion of the first surface (Z1) engages behind the remaining part of the second surface (Z2),
  the stamp (ST) is returned to its starting position,
  the template (MT) and mandrel (DO) are removed.

Numbered Paragraph 2. The method according to Numbered Paragraph 1, characterized in that the stamp (ST) blocks a channel (KA) inside the mandrel (DO) until the pressure exerted by the medium (M) therein is strong enough to cause the stamp (ST) to move.

Numbered Paragraph 3. The method according to Numbered Paragraph 1 or 2, characterized in that a joint (VB) is obtained by at least partially deforming the material forming the two surfaces (Z1, Z2), which ends up at least partially above and/or outside the two surfaces (Z1, Z2).

Numbered Paragraph 4. The method according to Numbered Paragraph 1, 2 or 3, characterized in that the direction in which the stamp (ST) moves substantially follows at least one of the surface normals of the two surfaces (Z1, Z2).

Numbered Paragraph 5. The method according to any of the preceding Numbered Paragraphs, characterized in that the first part (T1) is a closed tube, and the first surface (Z1) is formed by at least part of the wall of the tube, by wherein the tube and the mandrel (DO) are positioned such that their central axes (MA) substantially coincide.

Numbered Paragraph 6. The method according to any of the preceding Numbered Paragraphs, characterized in that the template (MT) is nearly stationary, and the size of the deep drawing opening (TO) remains constant.

Numbered Paragraph 7. A device (100) for executing the method according to any of the Numbered Paragraphs 1 to 6, characterized in that the channel (KA) has an opening (O) through which the medium (M) can flow out, and is connected to a compressor.

Numbered Paragraph 8. The device (100) according to Numbered Paragraph 7, characterized in that the stamp (ST) is pivotally supported in the channel (KA).

Numbered Paragraph 9. The device (100) according to Numbered Paragraph 7 or 8, characterized in that the mandrel (DO) has a lateral opening (OS) through which the stamp (ST) is moved.

Numbered Paragraph 10. The device (100) according to Numbered Paragraph 7, 8, or 9, characterized in that the lateral opening (OS) in the mandrel (DO) is sealed off from the environment by the first surface (Z1) in a fluid-tight manner.

Numbered Paragraph 11. The device (100) according to Numbered Paragraph 7, 8, 9, or 10, characterized in that the deep drawing opening (TO) in the template (MT) forms a blind hole in both the radial and axial directions thereof.

Numbered Paragraph 12. The device (100) according to Numbered Paragraph 7, 8, 9, 10, or 11, characterized in that the stamp (ST) has a round working pin (AZ), which at least partially enters the deep drawing opening (TO).

Numbered Paragraph 13. A heat exchanger (200) containing at least two parts (T1, T2), which are joined to one another with the method according to any of the Numbered Paragraphs 1 to 6.

Numbered Paragraph 14. The heat exchanger (200) according to Numbered Paragraph 13, characterized in that the first part (T1) is a tube and the second part (T2) is a bracket with which the heat exchanger (200) is attached to another component, wherein the diameter of the tube is greater than 20 mm.

Numbered Paragraph 15. A refrigerant circuit for a motor vehicle that contains at least one heat exchanger (200) according to Numbered Paragraph 13.

LIST OF REFERENCE SYMBOLS

- 100 device for executing the method obtained with the invention
- 200 heat exchanger containing two parts connected to one another by the method obtained with the invention
- Z1, Z2 surfaces with simple curvatures
- T1, T2 two parts that are joined to one another with the method obtained with the invention
- RO tube that has a surface with a simple curvature
- VB resulting joint
- DO mandrel for the device
- MT template for the device
- KA channel inside the mandrel
- ST stamp inside the mandrel
- AZ working pin on the stamp
- TO deep drawing opening in the template
- SO lateral opening in the mandrel
- O opening in the mandrel
- M medium that flows through the channel
- BR movement direction for the stamp
- AS movement axis along which the stamp is moved
- MS central axis for the mandrel and the first part
- F guide for the medium

The invention claimed is:

1. A joining method comprising the following steps:
    positioning a first part and a second part, with the second part positioned above the first part, the first part has a first surface and the second part has a second surface, the first part and the second part each have simple curvatures,
    positioning a mandrel below the first surface, the mandrel contains a moving stamp in its interior,
    positioning a template above the second surface, the template has a deep drawing opening,
    moving the stamp along a surface that is aligned normal to at least one of the first or second surfaces, such that material of the respective first and second surfaces is forced into the deep drawing opening,
    wherein
       the stamp blocks a channel inside the mandrel until a hydraulic pressure exerted by a fluid against a surface of the stamp is large enough to cause the stamp to move, wherein
       in order to obtain a form-fit connection between the first and second surfaces a deep drawn portion of the first surface engages behind portions of the second surface that surround a deep drawn portion of the second surface, wherein the template is disposed such that the template does not move in relation to the stamp, and the size of the deep drawing opening remains constant,
       the stamp is returned to its starting position, and
       the template and mandrel are removed.

2. The method according to claim 1, wherein a joint is obtained by at least partially deforming the material forming the first and second surfaces which ends up at least partially above and/or outside the first and second surfaces.

3. The method according to claim 1, wherein the stamp moves substantially at a right angle with respect to at least one of the first surface or the second surface.

4. The method according to claim 1, wherein the first part is a closed tube, and the first surface is formed by at least part of the wall of the tube, wherein the tube and the mandrel are positioned such that their respective central axes coincide or are aligned such that their respective central axes have an angular deviation of ±10° or less.

5. A joining method comprising the following steps:
    positioning a first part and a second part, with the second part positioned above the first part, the first part has a first surface and the second part has a second surface, the first part and the second part each have simple curvatures,
    positioning a mandrel below the first surface, the mandrel contains a moving stamp in its interior,
    positioning a template above the second surface, the template has a deep drawing opening,
    moving the stamp along a surface that is aligned normal to at least one of the first or second surfaces, such that material of the respective first and second surfaces is forced into the deep drawing opening,
    wherein
       the stamp blocks a channel inside the mandrel until pressurized air acting against a surface of the stamp is large enough to cause the stamp to move, wherein
       in order to obtain a form-fit connection between the first and second surfaces, a deep drawn portion of the first surface engages behind portions of the second surface that surround a deep drawn portion of the second surface, wherein the template is disposed such that the template does not move in relation to the stamp, and the size of the deep drawing opening remains constant,
       the stamp is returned to its starting position,
       the template and mandrel are removed.

6. The method according to claim 5, wherein a joint is obtained by at least partially deforming the material forming the first and second surfaces, which ends up at least partially above and/or outside the first and second surfaces.

7. The method according to claim 5, wherein the stamp moves substantially at a right angle with respect to at least one of the first surface or the second surface.

8. The method according to claim 5, wherein the first part is a closed tube, and the first surface is formed by at least part of the wall of the tube, wherein the tube and the mandrel are positioned such that their respective central axes coincide or are aligned such that their respective central axes have an angular deviation of ±10° or less.

* * * * *